No. 641,337. Patented Jan. 16, 1900.
F. A. SEIBERLING.
PROCESS OF MANUFACTURING PNEUMATIC TIRES.
(Application filed May 15, 1899.)

(No Model.) 4 Sheets—Sheet 1.

Witnesses:
Ray Lumer.
Nellie M. Danforth

Inventor:
Frank A. Seiberling,
By Humphrey & Humphrey,
Atty's.

No. 641,337. Patented Jan. 16, 1900.
F. A. SEIBERLING.
PROCESS OF MANUFACTURING PNEUMATIC TIRES.
(Application filed May 15, 1899.)
(No Model.) 4 Sheets—Sheet 2.

Witnesses:
Ray Lunier.
Nellie M. Danforth.

Inventor:
Frank A. Seiberling,
By Humphrey & Humphrey,
Attys.

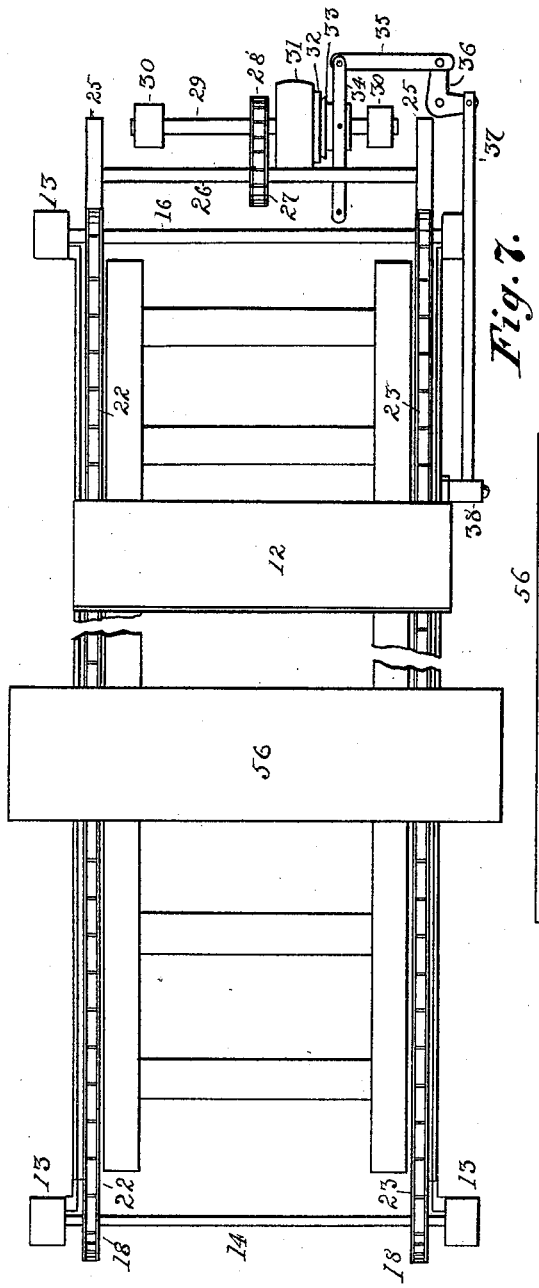

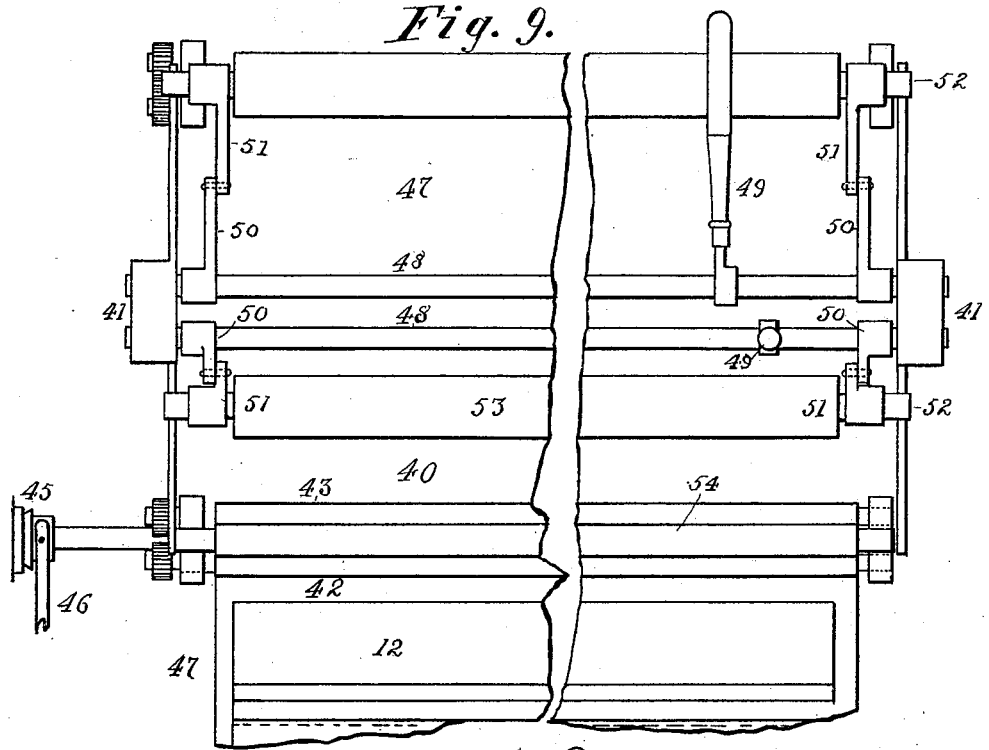

United States Patent Office.

FRANK A. SEIBERLING, OF AKRON, OHIO.

PROCESS OF MANUFACTURING PNEUMATIC TIRES.

SPECIFICATION forming part of Letters Patent No. 641,337, dated January 16, 1900.

Application filed May 15, 1899. Serial No. 716,900. (No model.)

*To all whom it may concern:*

Be it known that I, FRANK A. SEIBERLING, a citizen of the United States, residing at Akron, in the county of Summit and State of Ohio, have invented a certain new and useful Improvement in Processes of Manufacturing Pneumatic Tires, of which the following is a specification.

This invention has relation to improvements in processes for the manufacture of pneumatic tires for bicycles and other vehicles.

The object of this invention is to rapidly conduct the operation of making such tires from the various materials from which they are constructed, which tires shall have an inner tube of rubber, a body composed of woven fabric saturated with rubber, and an outer covering of rubber, and when desired a strip of rubber on the outer periphery to reinforce the tread portion, the whole vulcanized.

In carrying out this process certain mechanism is employed to facilitate the various steps of the process, which mechanism is illustrated in the accompanying drawings, forming a part of this specification.

Figure 3:
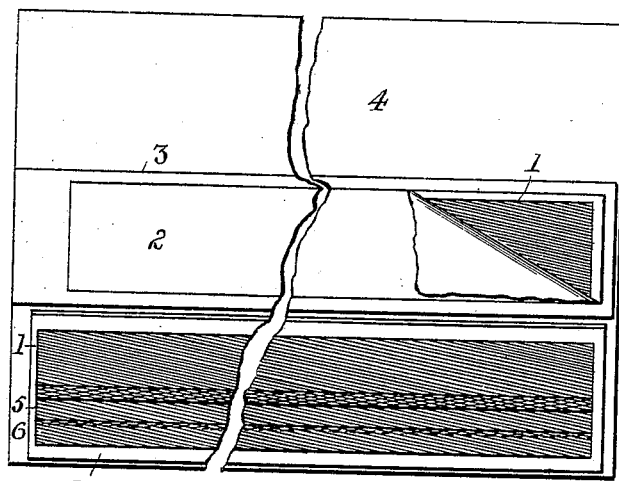
Figure 2:
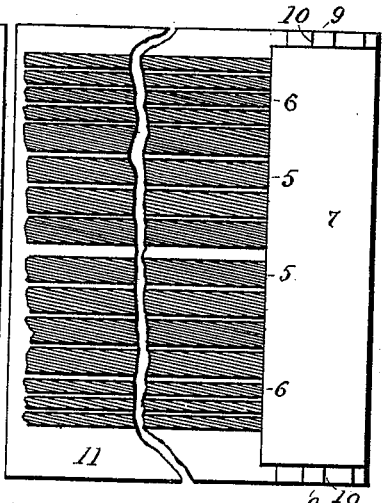
Figure 4:
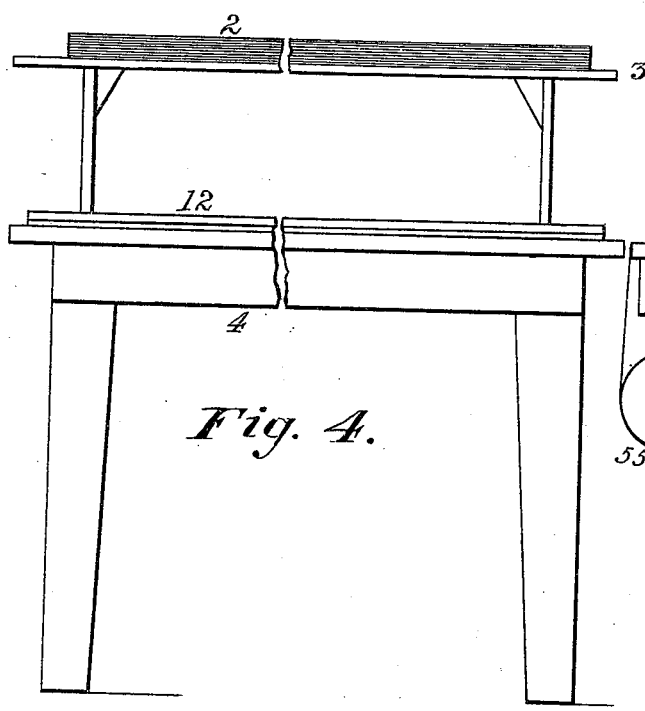
Figure 1:
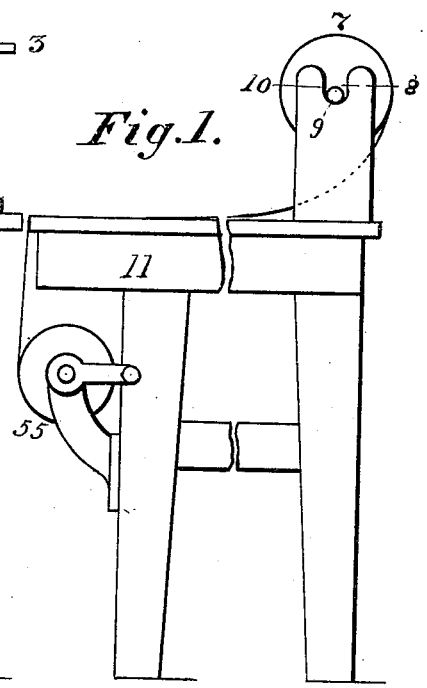
Figure 5:
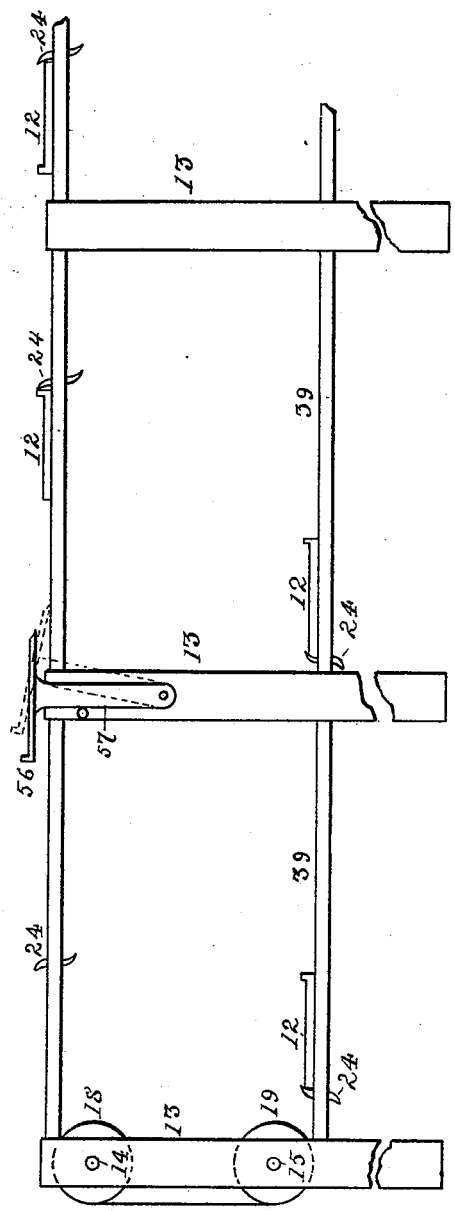
Figure 6:
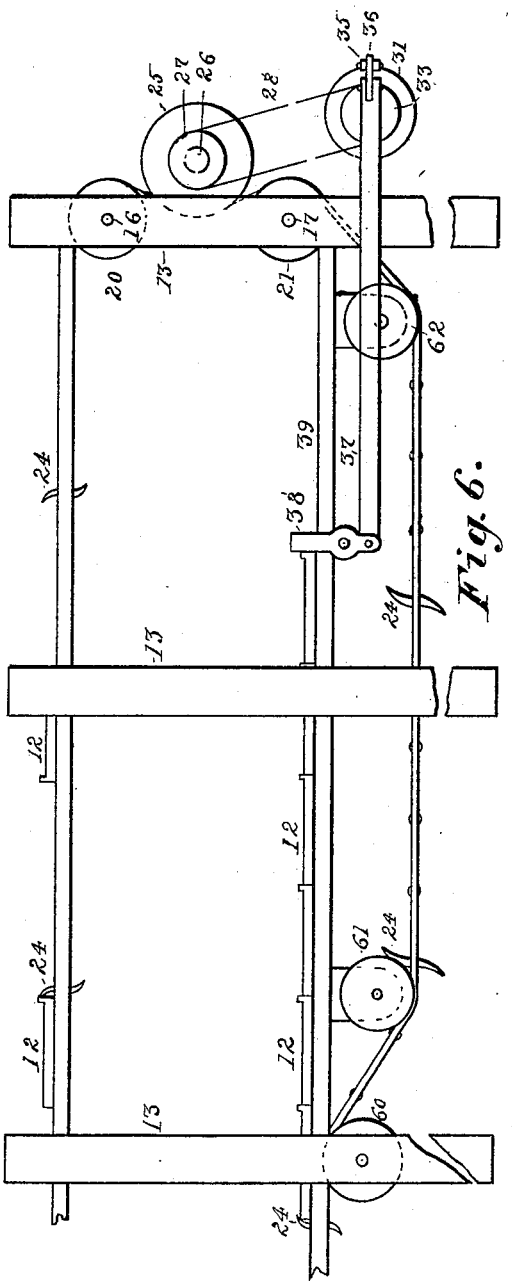

In the drawings, Figure 1 is a side elevation of the stock-table broken in the center to reduce its length in the view and showing the stock-rolls; Fig. 2, a plan of the same similarly broken; Fig. 3, a plan of the assembling-table, also broken; Fig. 4, a side elevation of the same; Fig. 5, a side elevation of a part of the conveyer to pass the boards bearing the assembled strips to the rolling device and to return the empty boards; Fig. 6, the remaining portion of said conveyer; Fig. 7, a plan of the conveyer with a part in the center broken away to reduce its length; Fig. 8, a section of the same at the break in Fig. 7 looking to the left; Fig. 9, a plan of the tire-rolling device, and Fig. 10 a side elevation of the same.

The mode of practicing this invention is as follows: The fabric, saturated with rubber, of which the main body of the tire is constructed, is previously cut into convenient strips 1 to form the tires and placed in books 2, having cloth leaves, and as needed a single book is brought and laid on the upper shelf 3, supported above the assembling-table 4. The assembling-table may have this book-support in the center, as shown, so that two persons may work to assemble the parts on opposite sides, or it may be adapted for a single workman.

The rubber strips 5 for forming the outer cover for the tire and the narrower ones 6 to reinforce the tread portion of the tire are run side by side from the calender-rolls on long strips of cloth, which are wound into the rolls 7 on a roller 8, having end journals 9. These rolls are successively brought as needed and mounted in bearings 10 of the stock-table 11, which for convenience is located at one end of and adjacent to the assembling-table.

To hold the assembled parts, light boards 12, having one raised edge, are used, and in forming the tire a strip 1 of the rubber-saturated fabric is taken by the attendant workman from the book 2 and laid on one of these boards and by means of a pattern cut to the exact size required. The strip of cloth of the roll 7 is then unwound sufficiently to expose enough of the wide and narrow strips 5 and 6 for tires and suitable lengths cut off for that purpose. In repeating this operation the cloth of the roll 7 is carried over the edge of the table 11 and rewound on an under roll 55 of the table. One of the wider strips of rubber 5 is then laid on the board and one edge lapped on the edge of the body-strip 1 to form the outer cover of the tire, the two adhering from the cohesive nature of the rubber. Beside and lapped on the edge of the strip 5 is one of the narrower strips 6 to form the reinforcing-layer on the tire-tread, the two similarly adhering. The board 12, with the parts thus assembled, is then placed on the left-hand lower portion of the conveyer to be carried to the rolling device. This conveyer consists of a supporting-frame 13, in the opposite ends of which are journaled shafts 14, 15, 16, and 17, which bear at their ends pairs of sprocket-wheels 18, 19, 20, and 21, and on these wheels run two endless sprocket-chains 22 23, each provided at intervals with upwardly and downwardly projecting fingers 24, severally inclined in the direction of the motion of the chains. These chains are driven simultaneously in the same direction by two sprocket-wheels 25 on the ends of the shaft 26, journaled in any convenient part of the apparatus; but as the location only is deemed necessary to be shown the bearings of this and the next shaft are not shown. These wheels 25 engage the sprocket-chains 22 23 between the upper and lower sprocket-wheels 20 21. The shaft 26 bears at its center a wheel 27, driven by a chain 28 from a like wheel on a counter-shaft 29, supported in bearings 30. On the shaft 29 is a loose pulley 31, provided with one member 32 of a pan-clutch, arranged to be engaged by a tight member 33, arranged to be moved by a lever 34. The lever 34 is connected by a short bar 35 with one arm of a bell-crank 36, the opposite arm being connected by a bar 37 with one arm of a lever 38, pivoted in a support from guide-rails 39 in the lower part of the frame, and with its upper arm projecting above said guide-rails for a purpose to be stated.

In the right half of the conveyer-frame the lower part of the chains 22 23 are conducted below the guide-rails 39 by means of wheels 60, 61, and 62.

The assembling-boards 12 as rapidly as the parts of the tire are placed thereon, as hereinafter explained, are placed in the lower part of the conveyer near the left end in position to be engaged by the fingers 24, the assembling-table being for this purpose placed in that location. They are pushed along the guide-rails 39 by the operation of the chains and fingers until they reach the rolling-table, hereinafter explained, whence they are successively taken by the operative at that table. If for any reason they arrive too fast for that operative and accumulate on the guide-rails, they encounter the upper end of the lever 38 and throw the clutch mechanism in the shaft 29 out of contact, thus arresting the movement and to that extent making this part automatic.

The rolling-table consists of a substantial table 40, supporting a housing 41, at each end of which are located two parallel rolls 42 and 43, bearing end pinions that mesh in a gear 44, driven from any convenient source of power by means of a clutch 45, operated by a lever 46. These gears are removed at the left of Fig. 9 to show the housing at the points, which, it will be noticed, is hollowed between the journals at the top and for a purpose to be stated. Immediately opposite each set of rolls is located a shelf 47 to receive the board 12. At the top center of the housing are journaled parallel independent shafts 48, each having a lever 49 by which it may be rocked. On the ends of these shafts are fixed crank-arms 50, their ends being pivotally connected with similar crank-arms 51, in which are journaled shafts 52, bearing a roller 53. To operate this part of the process, a mandrel 54, on which the tire is to be built up and having the inner tube already placed thereon, is laid with its ends in the hollow portion of the housing between the rolls 42 and 43. A board 12, with the parts assembled thereon, is then placed on one of the shelves and the edge of the body-strip carried onto the inner tube on the mandrel 54. The rollers are then put in motion by operating the clutch 45, hereinafter referred to, and the adjacent lever 49 is then rocked toward the board, thus bringing the roller 53 on the edge of the body-strip on the mandrel 54, which is immediately revolved by friction with the rolls 42 and 43, and rolls the body-strip upon the inner tube, thus forming a complete tube, with a reinforcing-strip 6 directly inside of the tread and the wide strip 5 covering the tube. The mandrel, with the complete tire, is then removed, the boss for the air-valve placed, the tire removed, its ends joined in the usual manner, and the whole vulcanized. After the assembled parts have been rolled into a tube, as hereinbefore described, the board is placed on the upper chains of the conveyer to be carried back to the assembling-table. To arrest these boards, there is provided opposite the assembling-table, or each table, if a number are used, on the conveyer a rocking platform 56, located horizontally above the conveyer, supported by arms 57, pivoted to the frame of the conveyer. When the operator at the assembling-table needs a board, this platform is rocked down, so that the board will ride up on it.

In some tires the reinforcing-strip 6 is not used, and hence in such cases the foregoing process will be modified to the extent of omitting that part.

I claim as my invention—

1. That improvement in the art of making tubes for pneumatic tires which consists in forming a blank for the body of rubber-saturated fabric; placing at determined locations thereon strips of rubber to form a reinforcing portion and a cover, and rolling the same under external pressure upon an inner tube, substantially as described.

2. That improvement in the art of making tubes for pneumatic tires which consists in forming a blank for the body of rubber-saturated fabric; placing at determined places thereon strips of rubber to form a reinforcing portion and a cover, and rolling the same under pressure from three directions upon an inner tube, substantially as shown and described.

3. That improvement in the art of making tubes for pneumatic tires which consists in forming a blank for the body of rubber-saturated fabric, placing adjacent thereto and with its edge lapped thereon, a strip of rubber to form a cover and rolling the same under pressure simultaneously from different radial directions upon an inner tube, substantially as shown and described.

In testimony that I claim the above I hereunto set my hand.

FRANK A. SEIBERLING.

In presence of—
C. P. HUMPHREY,
C. E. HUMPHREY.